United States Patent [19]

Wohlbach

[11] 3,731,303
[45] May 1, 1973

[54] MAGNETIC LATCHING INDICATOR
[75] Inventor: Harry E. Wohlbach, Allentown, Pa.
[73] Assignee: Electro Mechanical Instrument Company, Inc., Perkasie, Pa.
[22] Filed: May 5, 1970
[21] Appl. No.: 34,720

[52] U.S. Cl. ........................... 340/373 R, 340/372 R
[51] Int. Cl. .............................................. G08b 5/22
[58] Field of Search ........................ 340/373 R, 372 R

[56] References Cited

UNITED STATES PATENTS

| 3,553,619 | 1/1971 | Skrobisch | 340/373 X |
|---|---|---|---|
| 3,560,966 | 2/1971 | Deshler | 340/373 R |
| 3,573,812 | 4/1971 | Pihl | 340/373 R |
| 2,866,965 | 12/1958 | Houdek | 340/373 X |
| 3,309,696 | 3/1967 | Alster | 340/373 |
| 2,359,546 | 10/1944 | Carroll | 340/373 X |
| 3,267,455 | 8/1966 | McGuire | 340/373 X |
| 3,524,358 | 8/1970 | Dick et al. | 340/373 X |

Primary Examiner—Harold I. Pitts
Attorney—Woodcock, Washburn, Kurtz & Machiewicz

[57] ABSTRACT

In an indicator having a moving permanent magnet mounted on an arbor, a pointer is mounted on the arbor for rotation independent of the rotation of the moving magnet. This moving permanent magnet engages a projection on the pointer during a portion of its rotation. A control permanent magnet is positioned with its poles lying in the plane of the first permanent magnet poles to latch the moving permanent magnet by repulsion upon rotation in one direction or the other.

8 Claims, 4 Drawing Figures

Patented May 1, 1973  3,731,303

MAGNETIC LATCHING INDICATOR

BACKGROUND OF THE INVENTION

Small electric indicators are extensively used in electrical circuits to indicate, for example, the polarity of current flow, the on or off condition of a circuit or the set-reset condition of a circuit. Often, the electrical signal, or current, which sets the indicator is momentary. It is desirable to maintain the indicator in its set condition until a current of the opposite polarity is applied to reset the indicator. Then, it is desirable to have the indicator latched in the reset position.

Examples of prior art indicators include those shown in U.S. Pat. No. 1,526,494 — Henschel, No. 1,940,521 — Acosta and No. 2,444,476 — Stearn. Devices such as these do not meet the requirements of a rugged, easily constructed indicator which will function in the manner previously described.

RELATED CASES

The present invention is a set-reset magnetic latching indicator using a subminiature meter movement and casing of the type shown in U.S. Pat. No. 3,510,773.

Summary of the Invention

In accordance with an important aspect of the present invention, the moving permanent magnet which drives the pointer to one of its two indicating positions is fixedly mounted on the arbor independent of the movement of the pointer. The magnet and arbor have an initial rotation before the magnet engages a projection on the pointer to drive the pointer to one of its extreme positions. When a current of opposite polarity is applied to the operating coil, the permanent magnet has an initial rotation before it again engages the projection on the pointer to drive the pointer to its other extreme position. A control permanent magnet is positioned with its poles lying in the approximate plane of the first magnet to latch the pointer in either of its two extreme positions. The pointer and magnet are held in either of the two extreme positions by the repulsion force between the poles of the moving permanent magnet and the control permanent magnet.

An indicator constructed in this manner has the advantages of reliable operation, rugged serviceability, and simple inexpensive construction.

In accordance with another important aspect of this invention, the repulsion force between the moving permanent magnet and the control permanent magnet may be strong with respect to inertial vibration or shock forces that may be encountered tending to unlatch the device, thus producing a false indication. This is to be contrasted with the latches used in the prior art which have the desired "over center" action, but which do not have a strong residual force holding the pointer in its latched position.

In accordance with another aspect of the invention, the control permanent magnet, which provides the latching function by repelling the moving permanent magnet, forms a portion of an outer housing for the indicator.

In accordance with a further aspect of the invention, the pointer is mounted on the arbor between a flanged bushing and the moving permanent magnet which defines the plane of rotation of the pointer.

In accordance with another aspect of this invention, the moving permanent magnet is a truncated circle, one side of which engages the projection on the pointer.

DESCRIPTION OF A PARTICULAR EMBODIMENT

Figure 1:
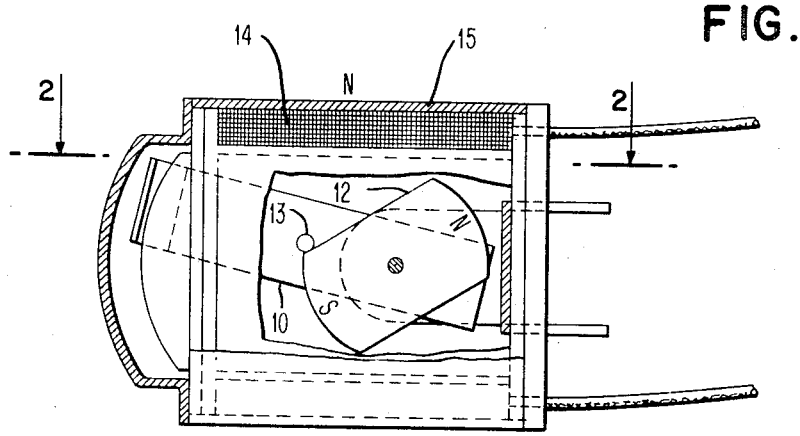
FIG. 1 shows a top sectional view of the indicator.

Referring to the figures, the indicator includes a pointer 10 mounted on an arbor 11. The pointer 10 rotates on the arbor independent of the rotation of the arbor and the moving permanent magnet.

A projection 13 on the pointer is engaged by the moving permanent magnet 12 during only a portion of its rotation.

An electrically energized operating coil 14 drives the moving permanent magnet 12 in one rotational direction or the other depending upon the polarity of the energizing current.

Figure 4:
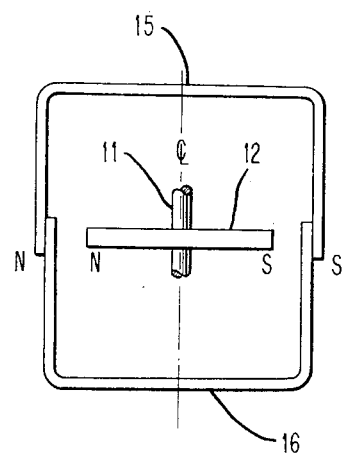
FIG. 4 is a front view of the control magnet, moving magnet, shield and arbor.
Figure 3:
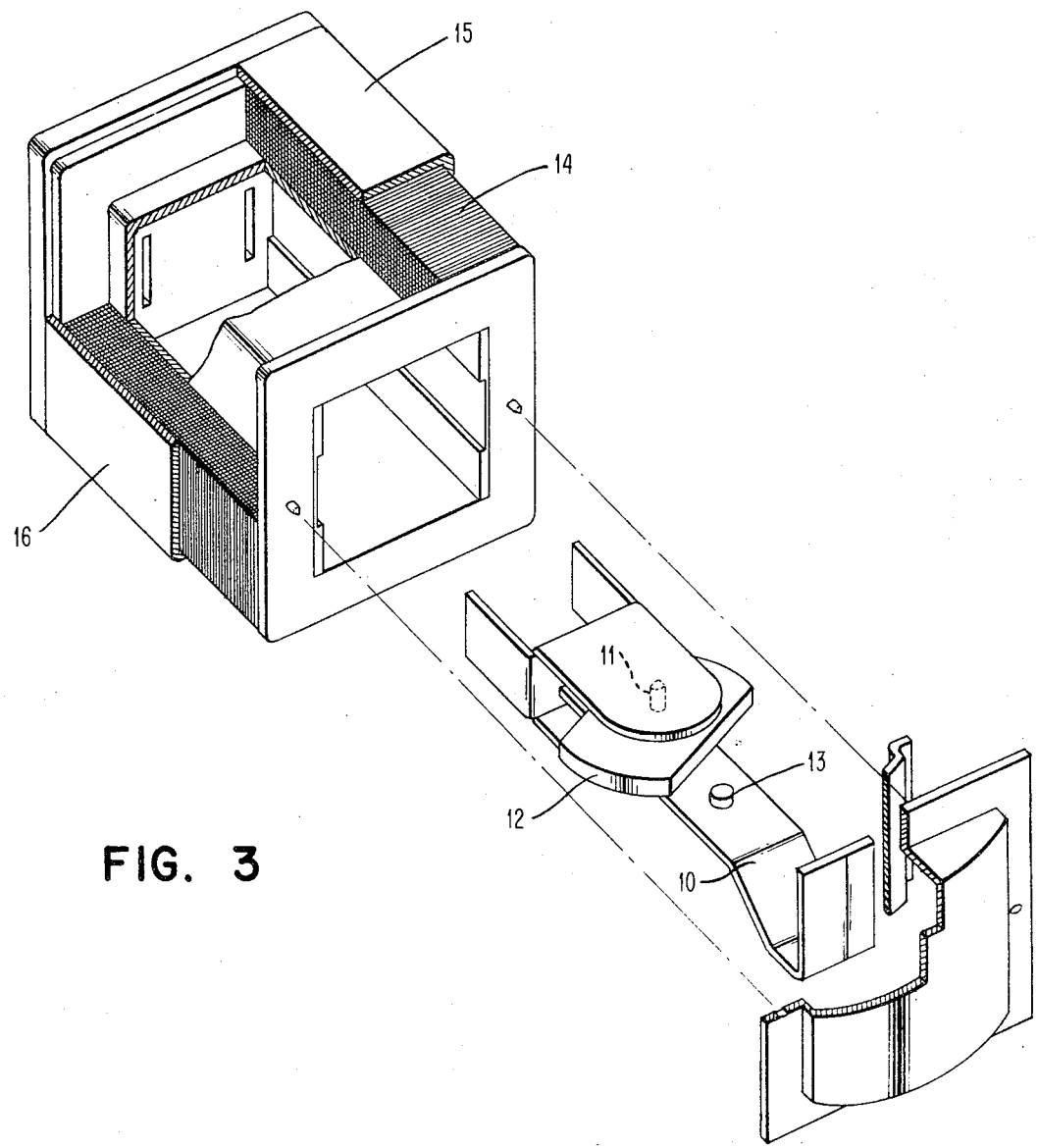
FIG. 3 is an exploded perspective view of the indicator.

A control permanent magnet 15 is positioned with its poles lying approximately in the plane of the first magnet. (See FIG. 4) The two poles of the control magnet 15 lie in the plane of the moving magnet 12 and have a center line between them which extends through the center line of the arbor 11. The control permanent magnet 15 latches the moving permanent magnet 12 upon rotation to one extreme position or the other by repulsion. The control permanent magnet 15 forms one portion of an outer housing for the indicator. The other portion 16 of the outer housing is a shield constructed of soft magnetic material such as Shield Mu or other suitable material.

Figure 2:
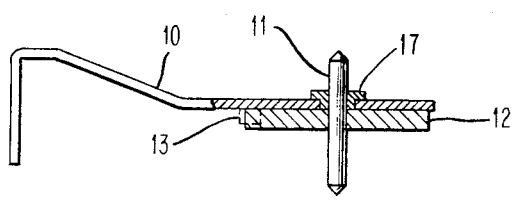
FIG. 2 is a partial section along the line 2—2 in FIG. 1.

A flanged bushing 17 (FIG. 2) is positioned on the arbor. The pointer 10 is between the flange of the bushing 17 and the magnet 12 so that the bushing 17 and the magnet 12 define the plane of rotation of the pointer 10.

As best seen in FIG. 1 the moving permanent magnet 12 is a truncated circle one side of which engages the projection 13 on the pointer 10.

The operation of the indicator is this. Upon energization of the coil 14 with sufficient current of one polarity, the moving permanent magnet 12 rotates in one direction until one side of the moving magnet engages the projection 13. That is, the moving magnet is free to rotate within fixed limits independently of the pointer. Then the moving magnet 12 engages the projection 13 and drives the pointer to one extreme position. The pointer is held in this position, for example, the position shown in FIG. 1, because the moving permanent magnet 12 is being repelled by the control magnet 15. When the coil is energized with sufficient current of opposite polarity, the moving magnet 12 will rotate in a reverse direction. When the poles on the moving magnet 12 pass the poles on the control magnet 15, the moving magnet will continue to move at an accelerated speed because of repulsion of the two poles. This causes the moving magnet 12 to hit the projection 13 on the pointer. Continued rotation carries the pointer to its extreme reverse position where the pointer is held by the latching action of the control magnet 15 by repelling the moving permanent magnet 12 until a sufficient current of opposite polarity is applied to coil 14 causing it to return to original position.

Many modifications may be made. The engagement means has been shown as a projection 13 on the pointer, but the projection could be on the moving magnet or engagement means other than a projection could be used.

While a particular embodiment of the invention and certain modifications have been described, other modifications may be made. The following claims are, therefore, intended to cover any such modifications within the true spirit and scope of the invention.

What is claimed is:

1. An indicator comprising:
   an indicating element mounted on an arbor,
   a moving permanent magnet mounted on said arbor for rotation which is independent of the rotation of said indicating element, within fixed limits,
   means for engagement between said indicating element and said moving permanent magnet said means driving said indicating element during only a portion of the rotation of said moving permanent magnet, said engagement defining said fixed units within which said permanent magnet rotates independent of the rotation of said pointer,
   an electrically energized operating coil which drives said moving permanent magnet in one rotational direction or the other upon energization with sufficient current, and
   a control permanent magnet having poles which latch said moving permanent magnet upon rotation in one direction or the other, said permanent magnet being driven past the poles and overcoming the repelling force of said poles in the portion of rotation which is independent of the rotation of said indicating element.

2. The indicator recited in claim 1 wherein said control permanent magnet forms one portion of an outer housing for said indicator and wherein another portion of said outer housing is a protective shield constructed of soft magnetic material.

3. The indicator recited in claim 1 further comprising a flanged bushing projecting through said indicating element said indicating element being positioned on said bushing between said moving permanent magnet and the flange on the bushing so that said magnet and said bushing define the plane of rotation of said indicating element.

4. The indicator recited in claim 1 wherein said moving permanent magnet is a truncated circle, one side of said truncated circle actuating said engagement means.

5. The indicator recited in claim 1 wherein rotation of said moving permanent magnet in one direction engages one side with said engagement means after an initial rotation to drive said indicating element to one extreme position, and wherein rotation of the moving magnet in the other direction disengages said one side from the engagement means to allow initial rotation in the other direction before the other side of said moving magnet re-engages said engagement means to drive said indicating element in the other direction to its other extreme position.

6. The indicator recited in claim 1 wherein said means for engagement includes a projection on said indicating element.

7. The indicator recited in claim 1 wherein said permanent magnet is positioned with its poles lying approximately in the plane of the poles of the moving permanent magnet.

8. The indicator recited in claim 7 wherein the poles of said control permanent magnet repel the poles of said moving permanent magnet when in the latched position.

* * * * *